(12) United States Patent
Gimpel et al.

(10) Patent No.: US 7,812,060 B2
(45) Date of Patent: Oct. 12, 2010

(54) METHOD FOR TREATMENT OF A GAS

(75) Inventors: Frederik Willem Hendrik Gimpel, Amsterdam (NL); Gerard Grootveld, Amsterdam (NL)

(73) Assignee: Shell Oil Company, Houston, TX (US)

( * ) Notice: Subject to any disclaimer, the term of this patent is extended or adjusted under 35 U.S.C. 154(b) by 519 days.

(21) Appl. No.: 11/791,566

(22) PCT Filed: Nov. 24, 2005

(86) PCT No.: PCT/EP2005/056209

§ 371 (c)(1),
(2), (4) Date: Oct. 16, 2007

(87) PCT Pub. No.: WO2006/056594

PCT Pub. Date: Jun. 1, 2006

(65) Prior Publication Data

US 2008/0234397 A1    Sep. 25, 2008

(30) Foreign Application Priority Data

Nov. 26, 2004   (EP) .................................. 04106100

(51) Int. Cl.
*C07C 27/00*    (2006.01)

(52) U.S. Cl. .................... 518/726; 518/700; 518/702; 518/703; 518/705

(58) Field of Classification Search ................. 510/700, 510/702, 703, 705, 726
See application file for complete search history.

(56) References Cited

FOREIGN PATENT DOCUMENTS

| GB | 632386 | 11/1949 |
|----|--------|---------|
| GB | 2168719 | 6/1986 |
| WO | WO 0142175 | 6/2001 |
| WO | WO 03035590 | 5/2003 |
| WO | WO 03072530 | 9/2003 |
| WO | WO 03083013 | 10/2003 |
| WO | WO2006056594 | 6/2006 |

OTHER PUBLICATIONS

International Search Report dated Feb. 13, 2006.
Oil and Gas Journal, Sep. 6, 1971, pp. 86-90.

*Primary Examiner*—Jafar Parsa

(57) ABSTRACT

A method of treating off-gas from a Fischer-Tropsch reaction comprises recovering the off-gas and hydrogenating a portion of the olefins present in the off-gas and converting a portion of the carbon monoxide present in the off-gas to carbon dioxide or methane. The treated off-gas is then fed to a hydrogen manufacturing unit such as a steam reformer to form hydrogen that can be used elsewhere in the process.

16 Claims, 1 Drawing Sheet

METHOD FOR TREATMENT OF A GAS

PRIORITY CLAIM

The present application claims priority to European Patent Application 04106100.3 filed 26 Nov. 2004.

FIELD OF THE INVENTION

This invention relates to a method for the treatment and use of Fischer-Tropsch off-gas.

BACKGROUND OF THE INVENTION

The Fischer Tropsch process is often used for the conversion of hydrocarbonaceous feedstocks into normally liquid and/or normally solid hydrocarbons. The feed stock (e.g. natural gas, associated gas, coal-bed methane residual hydrocarbon fractions, biomass and/or coal) is converted in a first step into a mixture of mainly hydrogen and carbon monoxide (this mixture is often referred to as synthesis gas or syngas). The partial oxidation of gaseous feedstocks, producing mixtures of especially carbon monoxide and hydrogen, can take place according to various established processes. These processes include the Shell Gasification Process, a process in which e.g. natural gas is reacted with an oxygen containing gas in the absence of a catalyst (partial oxidation). A comprehensive survey of this process can be found in the Oil and Gas Journal, Sep. 6, 1971, pp 86-90. Gasified coal which includes a mixture of $H_2$ and CO may also be used. Another process to produce synthesis gas is steam reforming. Combinations are also possible.

The synthesis gas is then converted in a second step over a suitable catalyst at elevated temperature and pressure into paraffinic compounds ranging from methane to high molecular weight molecules comprising up to 200 carbon atoms, or, under particular circumstances, even more.

Four main products streams are recovered from a Fischer-Tropsch reaction: a waxy hydrocarbon stream, a gaseous stream which on cooling results in light hydrocarbons, impure water and off-gas. The off-gas comprises unconverted synthesis gas, $C_2$-$C_4$ olefins, light $C_1$-$C_4$ hydrocarbons, $CO_2$ and inerts such as $N_2$ and Ar. Flaring the off-gas is inefficient and damaging to the environment. The use of the off-gas as fuel is also less efficient.

It has been proposed in WO03/035590 to recirculate the off-gas (referred to therein as tail gas) back into the Fischer-Tropsch reactor or into gasifiers. Gasifiers produce CO and $H_2$ for onward reaction in the Fischer-Tropsch reaction.

Whilst some of the off-gas can be recirculated to the Fischer-Tropsch reactor, recirculation of all of the off-gas to the Fischer-Tropsch reactor causes $CO_2$, $CH_4$ and inerts to build up thus reducing the amount of hydrocarbons produced by the Fischer-Tropsch reactor.

Feeding the off-gas back to the gasifiers (which produce the $H_2$ and CO mixture) results in problems relating to the relative ratio of $H_2$/CO. Gasifiers typically produce a $H_2$/CO ratio of 1.7-1.8 whereas the Fischer-Tropsch reaction typically requires a $H_2$/CO ratio of around 2.05. The recirculation of off-gas to the gasifiers reduces the $H_2$/CO ratio away from the preferred 2.05 ratio.

The third option disclosed in WO03/035590 is to use the off-gas as a fuel for power generation. However, in practice this may not consume all of the available off-gas and so an alternative use for the off-gas still needs to be found.

SUMMARY OF THE INVENTION

The present invention provides a method of treating off-gas from a Fischer-Tropsch reaction, the method comprising the steps of:
(i) recovering the off-gas from a Fischer-Tropsch reaction;
(ii) hydrogenating a portion of the olefins present in said off-gas.

Preferably the method includes the steps of, either prior to, simultaneous with or after step (ii);
(iii) removing or converting a portion of the carbon monoxide present in said off-gas; and
(iv) feeding the off-gas to a hydrogen manufacturing unit.

A portion of the carbon monoxide is preferably converted or removed (step (iii)) before the treated off-gas is fed into the reactant side of a hydrogen manufacturing unit (step (iv)).

BRIEF DESCRIPTION OF THE DRAWINGS

Without wishing to be restricted to a particular embodiment, the invention will now be described in further detail with reference to the accompanying drawing in which.

DETAILED DESCRIPTION OF THE INVENTION

Figure 1:
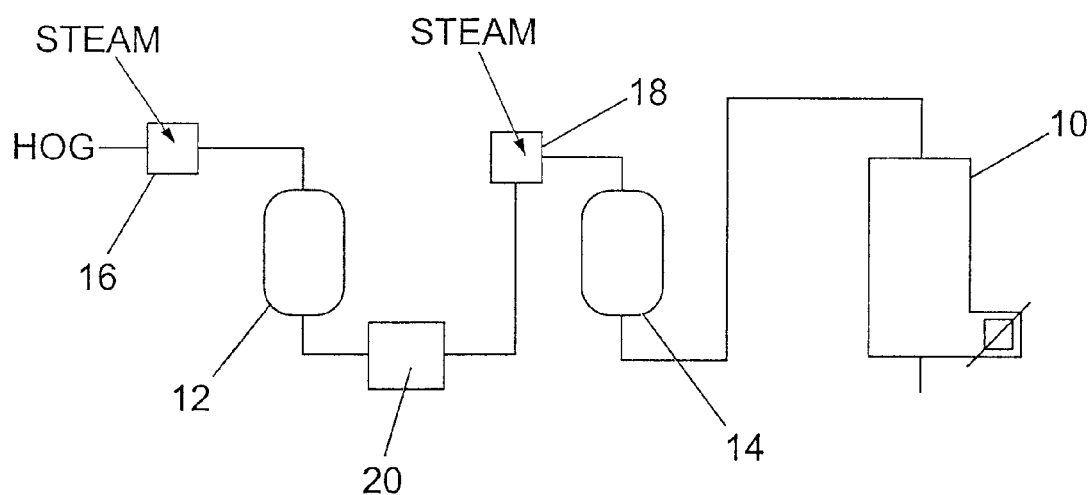
FIG. 1 is a schematic diagram of one embodiment of the invention.

The present invention discloses a process for hydrogenating the Fischer-Tropsch off-gas and utilizing it as a feed, preferably for a hydrogen manufacturing unit, particularly those based on steam reforming.

The temperature of a hydrocarbon manufacturing unit is usually rather high (inlet temperature of around 500° C.) in order to compensate for the low activity of the catalysts used therein. At such temperatures, the presence of CO in the inlet end of the hydrogen manufacturing unit causes coking according to the Boudouard reaction below (1).

$$2CO \rightarrow C + CO_2 \qquad (1)$$

Olefins are also known for causing coking of catalysts used in the hydrogen manufacturing unit. Carbon deposition or coking leads to hot spots on the catalyst and consequently reduces their activity. The hot spots are also formed on the reformer reactor tubes, and reduce their lifetime. The carbon deposits can be avoided or mitigated if olefins and preferably CO are removed from the off-gas stream.

The present invention provides a process to remove or convert a portion of at least the olefins within an off-gas stream before using the off-gas as a feed, for example as a feed for a hydrogen manufacturing unit based on steam reforming. In addition, the reaction preferably converts the carbon monoxide into methane and/or carbon dioxide, especially by reaction with water under the formation of carbon dioxide and hydrogen.

The present invention also provides a process to remove other compounds from an off-gas stream which can result in carbon deposition, for example CO, paraffins heavier than LPG and light naphtha.

Preferably substantially all of the carbon monoxide is converted or removed prior to being fed into the reactant side of a hydrogen manufacturing unit.

Typically the carbon monoxide is converted to a species which is not liable to cause carbon deposition, for example carbon dioxide or methane. The carbon monoxide is preferably not converted to a species which is liable to cause carbon deposition, such as carbon. Preferably a catalyst is used which combines olefin hydrogenation activity and CO shift activity. In that way olefins and carbon monoxide are removed, while additional hydrogen is made. Suitable catalyst for this process are copper-containing catalysts, especially Cu/ZnO catalysts.

Preferably the hydrogen manufacturing unit is a steam reformer.

Preferably the syngas produced by the hydrogen manufacturing unit has a sulphur content of below 1 ppm.

Optionally the hydrogenation is achieved in a first reactor using a shift catalyst.

Preferably the hydrogenation is achieved in a first reactor using a catalyst or catalysts selected from the group consisting of copper, especially copper/zinc oxide, nickel, nickel/tungsten, cobalt/molybdenum and sulfided nickel/molybdenum.

Preferably the catalyst is adapted to promote hydrogenation of unsaturated hydrocarbons. Preferably the catalyst is adapted not to promote the hydrogenation of carbon monoxide to methanol. Preferably the catalyst does not contain sulfur. Preferably the catalyst promotes hydrogenation of olefins and promotes conversion of carbon monoxide and water into carbon dioxide and hydrogen. This is especially important for gas streams comprising relatively high amounts of carbon monoxide, especially in combination with relatively high amounts of hydrogen. The use of e.g. nickel and/or cobalt containing catalysts may result in the formation of methane and/or methanol. These reactions are highly exothermic, which may result in high temperature which may damage the catalyst. Thus, copper-based catalyst, e.g. copper/zinc oxide catalyst, are preferred in combination with gas streams comprising more than 5% vol CO, especially more than 10% vol CO, based on the total gas stream. The amount of hydrogen is suitably more than 10% vol, especially more than 20% vol, more especially more than 30% vol.

More preferably hydrogenation may be conducted with a copper based catalyst, especially a Cu/ZnO catalyst. Preferably Mn is added to the Cu/ZnO catalyst to promote hydrogenation. Optionally Cs and/or Ce are added to the catalyst. Typically the Cu/ZnO is prepared by providing CuO/ZnO and reducing the CuO in the reactor prior to hydrogenating a portion of the olefins.

Steam may be added to the first reactor, typically to suppress Boudouard carbon formation.

The temperature of the first reactor is preferably 150-250° C. at the inlet, and preferably 200-500° C., especially 200-350° C. at the outlet.

In such embodiments, any further removal of CO can optionally be achieved in a separate reactor by use of a high temperature shift catalyst. The temperature range in the second reactor is preferably in the range 300-500° C. Preferably a catalyst adapted for catalysing the shift reaction (CO+$H_2O \rightarrow CO_2+H_2$) is used in the second reactor. One suitable catalyst would be a Fe/Cr catalyst. Also copper based catalysts may be used, especially copper/zinc oxide. Alternatively nickel/cobalt may be used.

Preferably the second reactor is provided in series with the first reactor and the hydrogen manufacturing unit. Steps (ii) and (iii) may be performed in any order or simultaneously but preferably the second reactor is downstream of the first reactor and preferably upstream of the hydrogen manufacturing unit and therefore step (ii) is preferably performed before step (iii).

Alternatively, the hydrogenation may be performed using a pre-reforming catalyst at a temperature suitable to promote hydrogenation of unsaturated molecules, typically hydrocarbons. For this alternative, steam is preferably added. Pre-reforming catalysts include Ni based catalysts, for example Ni on an alumina support may be used. Other options include Pt, Ru, Rh, precious metals or combinations thereof. Preferably the inlet temperature of the reactor containing the pre-reforming catalyst is between 300 and 500° C., more preferably 330-400° C.

In this alternative embodiment, preferably the catalyst promotes methanation of CO. Thus, for this embodiment, the steps (ii) and (iii) are performed simultaneously.

The hydrogen manufacturing unit produces syngas, that is a mixture of gases including carbon monoxide and hydrogen. Usually the $H_2$/CO ratio of the syngas is 4:1 till 9:1. Preferably a portion of the syngas produced by the hydrogen manufacturing unit is blended with syngas produced from a process utilising partial oxidation of methane or other feedstock and fed into the reactant side of a Fischer-Tropsch reactor.

A portion of the syngas, particularly the hydrogen, produced by the hydrogen manufacturing unit is also typically used for other purposes including hydrocracking and hydrogenation.

The present invention, in which tail gas of the Fischer-Tropsch reaction is hydrogenated to convert olefin into saturated compounds and in which carbon monoxide is converted into carbon dioxide while simultaneously producing hydrogen, is in particular combined with a process in which a hydrocarbonaceous feed is converted into syngas (for use as feed in the Fischer-Tropsch reaction) by means of non-catalytic partial oxidation. Such non-catalytic partial oxidation processes, in which an oxygen containing gas is used, result in syngas streams having an $H_2$/CO ratio of between 1.0 and 1.8, depending on the feed. As the Fischer-Tropsch reaction, especially the low temperature cobalt catalysed reaction, has a consumption ratio between 2.0 and 2.1, additional hydrogen is needed. By conversion of carbon monoxide by means of the water gas shift reaction, rather than converting it into methane or methanol, an increased amount of hydrogen is obtained, thus, at least partly, supplying the additional hydrogen needed. An example of a non-catalytic partial oxidation process is the Shell Gasification process (see Oil and Gas Journal, Sep. 6, 1971, pp. 86-90). Natural gas, residual oil fraction, coal and biomass can be used as feed for the partial oxidation process.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

Hydrogen and carbon monoxide (synthesis gas) is typically fed to the three-phase slurry reactor at a molar ratio in the range from 0.4 to 2.5. Preferably, the hydrogen to carbon monoxide molar ration is in the range from 1.0 to 2.5.

The gaseous hourly space velocity may very within wide ranges and is typically in the range from 1500 to 10000 Nl/l/h, preferably in the range from 2500 to 7500 Nl/l/h.

The Fischer-Tropsch synthesis is preferably carried out in a slurry phase regime or an ebullating bed regime, wherein the catalyst particles are kept in suspension by an upward superficial gas and/or liquid velocity.

It will be understood that the skilled person is capable to select the most appropriate conditions for a specific reactor configuration and reaction regime.

Preferably, the superficial gas velocity of the synthesis gas is in the range from 0.5 to 50 cm/sec, more preferably in the range from 5 to 35 cm/sec.

Typically, the superficial liquid velocity is kept in the range from 0.001 to 4.00 cm/sec, including liquid production. It will be appreciated that he preferred range may depend on the preferred mode of operation.

FIG. 1 shows the layout of a heavy paraffinic synthesis (HPS)-off-gas recycling process and comprises a first hydrogenation reactor 12 connected in series to a second, high temperature shift (HTS) reactor 14 which is in turn connected to a steam reformer 10.

A steam mixer 16/18 is provided upstream of each of the first and second reactors 12, 14 to add steam into the respective reactors 12, 14. A heater 20 is provided between the first 12 and second 14 reactors in order to increase the heat of the mixture flowing therebetween.

The configuration is utilised to convert coking causing species present in off-gas recovered from a Fischer-Tropsch reactor (not shown) to species which do not cause coking. Such off-gas is also referred to as HPS-off-gas or HOG. It will hereinafter be referred to as HOG.

The hydrogenation reactor 12 is provided with a catalyst which is capable of hydrogenating olefins in the presence of CO—some catalysts would be deactivated in the presence of CO. Moreover, other catalysts are also less suitable because they would hydrogenate the CO and $CO_2$ present in the off-gas mixture, creating exotherms which would require cooling mechanisms to control. Some suitable catalysts are discussed further below.

A small amount of steam from steam input 16 may be mixed with the HOG before hydrogenation of the olefins. The steam suppresses Boudouard carbon formation (as per reaction (1) below) and therefore helps minimise deactivation of the catalyst.

$$2CO \rightarrow C + CO_2 \quad (1)$$

As well as hydrogenation, the shift reaction may also occur in the reactor 12 according to reaction (2) below.

$$CO + H_2O \rightarrow CO_2 + H_2 \quad (2)$$

The treated HOG with reduced olefinic content proceeds to the second reactor 14 optionally via the heater 20. The heater 20 raises the temperature of the treated HOG which exits the reactor 12 at 200-300° C. and enters the second reactor 14 at 300-400° C.

In the second reactor 14, carbon monoxide is converted into carbon dioxide via the shift reaction (2). Steam is mixed with the treated HOG to provide sufficient $H_2O$ molecules for the shift reaction (2) to proceed and to suppress Boudouard carbon formation. As some of the CO will already be oxidised in the reactor 12, the workload of this reactor 14 is reduced. Naphtha present in the off-gas may also be broken down in the reactor 14.

The catalyst in the second reactor 14 can be any suitable high temperature shift catalyst. An Fe/Cr catalyst is preferred at the high temperatures used in reactor 14 because the temperature is normally too high for Cu/Zn low temperature shift catalysts which operate at a maximum 270-300° C.

The further treated HOG from the reactor 14 is then fed into the steam reformer 10. The absence of olefins in the treated off-gas and, in this embodiment, the absence of CO and $C_{2+}$ reduces or eliminates carbon deposits on the tubes leading to the steam reformer 10 and on the catalyst therein.

In the steam reformer 10, paraffins, particularly methane, are converted into hydrogen and carbon monoxide, according to reactions (3) and (4) below. (Other minor reactions also take place.) The input temperature of the steam reformer 10 is around 500° C. which rises to an output temperature of around 800-950° C.

$$CH_4 + H_2O \rightarrow CO + 3H_2 \quad (3)$$

$$CH_4 + 2H_2O \rightarrow CO_2 + 4H_2 \quad (4)$$

The reactions in the steam reformer 10 produce synthesis gas (i.e. a mixture of $H_2$ and CO) with a $H_2$/CO ratio of between 5-7. The $CO_2$ produced is recovered by conventional means (not shown).

Synthesis gas produced by way of the Shell gasification process (5) results in a $H_2$/CO ratio of about 1.6 to 1.8. A comprehensive survey of this process can be found in the Oil and Gas Journal, Sep. 6, 1971, pages 86-90.

$$CH_4 + O_2 \rightarrow CO + H_2O + H_2$$

$$2CH_4 + O_2 \rightarrow 2CO + 4H_2$$

$$CO + H_2O \rightarrow CO_2 + H_2 \quad (5)$$

The combination of the three reactions (5) results in a $H_2/CO$ ratio of 1.6-1.8. Thus to provide the preferred $H_2/CO$ ratio of 2.05 the synthesis gas from the steam reformer 10 can be blended with the synthesis gas from the Shell gasification process to produce the required $H_2/CO$ ratio for onward Fischer-Tropsch reactions. The hydrogen may also be utilised for the hydrogenation and hydroconversion of Fischer-Tropsch products.

The steam reformer 10 comprises a plurality of reactor tubes (not shown) and a furnace in which to heat the tubes. The input temperature of the mixture added thereto is around 500° C. but can range from 450-630° C. and the output temperature is around 860° C. but can range from 750-900° C. It generates the syngas mixture by the steam reforming mechanism (described above) rather than partial oxidation.

Lead catalysts are known for their use in hydrogenation and were considered for use in the reactor 12. However, lead catalysts absorb the CO present in the HOG, which causes deactivation of the catalysts and so they are not preferred. Other hydrogenation catalysts were also considered but were not suitable since they would cause hydrogenation of CO and $CO_2$ which is not desired.

Copper on zinc oxide is known as a shift catalyst and the skilled person typically attempts to minimise any hydrogenation which occurs using this catalyst. However it has surprisingly been found that such a shift catalyst can hydrogenate olefins in the presence of steam. Various CuO/ZnO catalysts were investigated for their suitability to catalyse the hydrogenation reaction taking place in reactor 12. These catalysts are commercially available e.g. from Sued Chemie (Munich, Germany). Similar catalysts are available from Johnson Matthey and Haldor Topsoe.

These catalysts, which are similar in chemical composition, are tuned for optimal performance in their specific area of application by addition of different promoters. Catalysts A and B are intended for operation in wet gas, and it is understood that Cs is added to suppress methanol formation. Catalyst C operates in relatively dry gas, and makes methanol. Catalyst D operates in dry gas, and it is understood that Mn is added to promote hydrogenation.

Small scale laboratory tests (+/−10 cc of catalyst) were carried out. The feed gas, a synthetic HOG, included 2% v ethylene and 0.8% v hexene. Steam was added to suppress Boudouard carbon formation (as per reaction (1) above). It should be noted that these catalysts, in addition to their hydrogenation activity are also catalysing the CO shift reaction (2).

$$CO + H_2O \rightarrow CO_2 + H_2 \quad (2)$$

Since a shift conversion step is a desired reaction in making HPS off-gas suitable as steam reformer feedstock, this type of catalyst has the advantage that it could remove part of the carbon monoxide as well as hydrogenate the olefins.

All catalysts showed good results. The tests showed catalyst C to exhibit the lowest activity. Catalyst D showed slightly better activity than catalysts B and C; catalyst D also retained the best crushing strength.

On the basis of these initial tests, a longer duration test of almost 500 hours was carried with catalyst D. The test was carried out at a pressure of 30 bar; the reactor inlet temperature was 200° C., steam/gas molar ratio 0.6. The reactor exit temperature was approx. 320° C., representing a temperature rise across the reactor of 120° C. (heater settings were adjusted to get an exit temperature which corresponds to the temperature rise to be expected in an adiabatic reactor due to the exothermic shift and hydrogenation reactions). The feed gas used during this test is shown in table 1 below.

TABLE 1

| Feed gas range employed during test | % vol |
|---|---|
| $H_2$ + CO | 19.3-22.4 |
| $CO_2$ | 37.1-38.0 |
| $CH_4$ | 33.3-34.5 |
| $N_2$ | 6.1-6.8 |
| ethene | 2.0 |
| hexene | 0.8 |

The results after 483 hours are shown in table 2 below.

TABLE 2

| Catalyst | Catalyst D 4.5. × 4.5 mm tablets |
|---|---|
| GHSV (dry) Nl/l/hr | 4000 |
| steam/gas ratio | 0.6 |
| initial ethene conversion | 100 |
| final ethene conversion | 97 |
| initial hexene conversion | 98 |
| final hexene conversion | 95 |
| initial CO conversion | 95 |
| final CO conversion | 92 |

Inspection after the test showed the catalyst to be in excellent condition. Thus the use of the CuO/ZnO catalyst D is preferred, although catalysts B and C can also be used.

Tests were also done with a small reactor (+/−100 cc catalyst) in a bypass line of a commercial plant, using catalyst D, on a real HOG feed. This was successfully tested for over 2000 hours thus confirming the above results.

The catalyst is sold as CuO/ZnO, and the copper is reduced to Cu in the reactor during the start up procedure. Ni, Ni/W, and Co/Mo based catalysts are also suitable. Pd on alumina was tried, but this catalyst was less suitable because of CO poisoning. Alternatively sulfided NiMo may be used, but this requires an additional sulphur removal step downstream and so this catalyst is less preferred.

Figure 2:
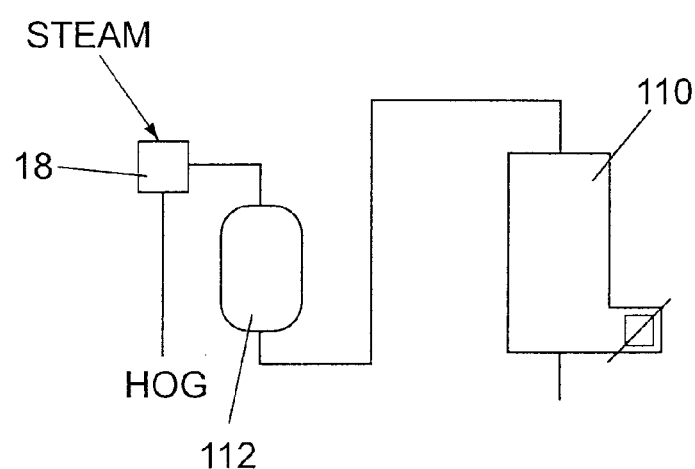
FIG. 2 is a schematic diagram of an alternative embodiment of the invention.

A second embodiment of the invention is shown in FIG. 2.

In this embodiment the olefins are hydrogenated and the carbon monoxide methanised in the same reactor, that is a reactor 112. A $Ni/Al_2O_3$ catalyst may be utilised such as commercially available catalysts from Sued Chemie, Munich, Germany or equivalent pre-reformer catalysts from Johnson Matthey (formerly Synetix) and Haldor Topsoe. The preferred catalysts have a nominal weight content set out in table 3.

| Constituent | Proportion (Nvt %) Sued Chemie Products | Proportion (Nvt %) Johnson Matthey product |
|---|---|---|
| NiO | 50-60 | 45-50 |
| MgO | 5-15 | 3.3 |
| $SiO_2$ | 3-7 | 4.2 |
| $K_2O$ | | 0.5 |
| $Cr_2O_3$ | | 1.5 |
| CaO | | 7.8 |
| $Al_2O_3$ | 5-15 | balance |

These catalysts are known for use as pre-reforming catalysts to convert $C_2$+ to methane at a temperature of around 450° C. However, in this application the catalyst has been found to also hydrogenate olefins at a lower temperature, around 350° C. at the reactor 112 inlet. The catalyst also cracks larger paraffins. Carbon monoxide and hydrogen from the shift reaction (2) react further to produce methane. The reactions are summarised below (6).

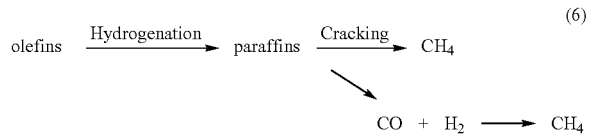

(6)

Another suitable catalyst would be noble metal based, for example iron or cobalt catalysts (e.g. CoMo), or nickel based catalysts, for example NiMo, TiW. Other catalysts, for example (pre-) reforming catalysts using Pt, Ru, Rh, etc. or combinations thereof are also suitable.

In use, the HOG is recovered from the Fischer-Tropsch reactor (not shown) and fed into the reactor 112. Steam is also injected from a steam input 118. The HOG gas enters the reactor 114 at a temperature of around 350° C. Olefins present in the HOG are hydrogenated and the resulting paraffins are either cracked to form methane or converted to CO and $H_2$ and onwards to methane as detailed in reaction (6) above. The treated off-gas exits the reactor 114 at a temperature of around 500° C.

The refined off-gas then proceeds to a steam reformer 110 for conversion to syngas. The resulting syngas is blended with syngas from the Shell gasification process to provide the preferred ratios of $CO/H_2$ and then fed back into the Fischer-Tropsch reactor as detailed above with respect to the first embodiment.

Thus the present invention allows HOG to be recycled, for example to the steam reformer rather than flared off.

Embodiments of the present invention also prevent or mitigate coking and subsequent deactivation of the catalyst used in the steam reformer.

An advantage of certain embodiments of the present invention is that longer chain paraffins are not introduced into the steam reformer. Therefore the steam reformer catalyst does not suffer from coking caused by the ethylene produced by cracked hydrocarbons.

A further advantage of certain embodiments of the invention is that CO is not hydrogenated and therefore facilities are not required to cope with the exotherms resulting from such hydrogenation.

An advantage of the FIG. 2 embodiment of the present invention is that the treatment to remove or reduce the coking causing species is performed in a single reactor rather than two separate reactors.

The invention further relates to a process for making normally liquid and optionally normally solid hydrocarbons, which process comprises (a) partial oxidation, optionally in combination with reforming, of a light hydrocarbonaceous feed stream, suitably a natural gas stream, to obtain a synthesis gas stream, (b) conversion of the synthesis gas stream over a catalyst, preferably a cobalt catalyst, into a stream of normally liquid and optionally normally solid hydrocarbons and an off-gas stream comprising unconverted carbon monoxide, unconverted hydrogen, $C_1$-$C_4$ hydrocarbons, part of the $C_2$-$C_4$ hydrocarbons being unsaturated hydrocarbons, carbon dioxide and optionally inert compounds, (c) hydrogenating the off-gas stream to convert the unsaturated hydrocarbons into saturated hydrocarbons and to convert carbon monoxide into methane, (d) reforming the hydrogenated off-gas stream by reaction with steam to obtain a product stream with increased hydrogen content, (e) optionally purification of the stream with the increased hydrogen content to obtain a further increase of the hydrogen content, and (f) using the streams with increased hydrogen content for the upgrading of the normally liquid and optionally normally solid hydrocarbons, e.g. hydrogenation, hydroisomerisation and/or hydrocracking, hydrodesulphurisation and/or increasing the $H_2/CO$ ratio of the syngas stream used in step (b) by physical mixing of the two streams only.

The above process describes a preferred use of the process as claimed in claim 1 of the present invention, as well as the dependent claims. The invention also relates to the hydrocarbon product which can be made in the process, including the products obtained by hydrogenation, hydroisomerisation and/or hydrocracking of the directly obtained products in the process optionally followed by a dewaxing step. Examples of such products are naphtha, kero, gas oil, waxy raffinate, base oils and wax.

We claim:

1. A method of treating off-gas from a Fischer-Tropsch reaction, the method comprising the steps of:
   (i) recovering the off-gas from a Fischer-Tropsch reaction, in which a cobalt Fischer Tropsch catalyst is used;
   (ii) hydrogenating a portion of the olefins present in said off-gas, the method further comprising;
   (iii) converting a portion of the carbon monoxide present in said off-gas to carbon dioxide or methane; and
   (iv) feeding the off-gas to a hydrogen manufacturing unit.

2. A method as claimed in claim 1, wherein the hydrogen manufacturing unit is a steam reformer.

3. A method as claimed in claim 1, wherein the hydrogenation is carried out in a first reactor using a catalyst or catalysts selected from the group consisting of copper, copper/zinc oxide, nickel, nickel/tungsten, cobalt/molybdenum and sulfided nickel/molybdenum.

4. A method as claimed in claim 3, wherein the hydrogenation is carried out using a copper/zinc oxide, catalyst in the first reactor.

5. A method as claimed in claim 3, wherein the carbon monoxide is removed or converted in a second reactor using a shift catalyst.

6. A method as claimed in claim 5, wherein the shift catalyst is selected from the group consisting of nickel/cobalt and iron/chromium based systems.

7. A method as claimed in claim 1, wherein the hydrogenation uses a pre-reformer catalyst at a temperature suitable to promote hydrogenation of unsaturated molecules as well as converting carbon monoxide by reaction with water into carbon dioxide and hydrogen.

8. A method as claimed in claim 7, wherein the input temperature of a reactor containing the pre-reformer catalyst is between 300 and 500° C.

9. A process for making normally liquid hydrocarbons, which process comprises
   (a) partial oxidation, of a light hydrocarbonaceous feed stream, suitably a natural gas stream, to obtain a synthesis gas stream;
   (b) conversion of the synthesis gas stream over a catalyst, into a stream of normally liquid hydrocarbons and an off-gas stream comprising unconverted carbon monoxide, unconverted hydrogen, $C_1$-$C_4$ hydrocarbons, part of the $C_2$-$C_4$ hydrocarbons being unsaturated hydrocarbons and carbon dioxide;

(c) hydrogenating the off-gas stream to convert the unsaturated hydrocarbons into saturated hydrocarbons and to convert carbon monoxide and water into carbon dioxide and hydrogen or converting the carbon monoxide to methanol;

(d) reforming the hydrogenated off-gas stream by reaction with steam to obtain a product stream with increased hydrogen content; and (e) using the streams with increased hydrogen content for the upgrading of the normally liquid hydrocarbons.

10. A process as claimed in claim 9, wherein the product stream with increased hydrogen content is further purified to obtain a further increase in the hydrogen content.

11. A process as claimed in claim 9, wherein the upgrading of step (e) comprises a process selected from the group consisting of hydrogenation, hydroisomerization and hydrocracking.

12. A process as claimed in claim 9, further comprising using the stream with increased hydrogen content to increase the $H_2$/CO ratio of the syngas stream used in step (b) by mixing it with the syngas stream of step (a).

13. A method as claimed in claim 1, wherein step (iii) is performed prior to step (ii).

14. A method as claimed in claim 1, wherein step (iii) is performed simultaneously with step (ii).

15. A method as claimed in claim 1, wherein step (iii) is performed subsequent to step (ii).

16. A method as claimed in claim 7, wherein the input temperature of a reactor containing the pre-reformer catalyst is between 330 and 400° C.

* * * * *